(12) United States Patent
Fukuma

(10) Patent No.: US 11,283,951 B2
(45) Date of Patent: Mar. 22, 2022

(54) IMAGE FORMING APPARATUS

(71) Applicant: KYOCERA Document Solutions Inc., Osaka (JP)

(72) Inventor: Nobuhiro Fukuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/202,154

(22) Filed: Mar. 15, 2021

(65) Prior Publication Data

US 2021/0289089 A1  Sep. 16, 2021

(30) Foreign Application Priority Data

Mar. 16, 2020 (JP) .............................. JP2020-045233

(51) Int. Cl.
*H04N 1/04* (2006.01)
*H04N 1/00* (2006.01)

(52) U.S. Cl.
CPC ....... *H04N 1/00557* (2013.01); *H04N 1/0066* (2013.01); *H04N 1/00551* (2013.01)

(58) Field of Classification Search
CPC ........... H04N 1/00557; H04N 1/00551; H04N 1/0066
USPC .......................... 358/400, 401; 399/380, 379
See application file for complete search history.

(56) References Cited

U.S. PATENT DOCUMENTS

| | | | | |
|---|---|---|---|---|
| 6,510,301 B2 * | 1/2003 | Tanaka | .................. | G03G 15/605 399/125 |
| 7,409,175 B2 * | 8/2008 | Kim | .................... | G03G 21/1647 399/107 |
| 8,610,910 B2 * | 12/2013 | Nishikawa | .......... | H04N 1/00525 358/1.13 |
| 2007/0195381 A1 * | 8/2007 | Yamazaki | ........... | H04N 1/00543 358/502 |
| 2008/0310898 A1 * | 12/2008 | Jo | ......................... | G03G 15/605 399/367 |

FOREIGN PATENT DOCUMENTS

JP     2014235214 A     12/2014

* cited by examiner

*Primary Examiner* — Cheukfan Lee
(74) *Attorney, Agent, or Firm* — Alleman Hall Creasman & Tuttle LLP

(57) ABSTRACT

A lateral slide member includes first locked portions and a second locked portion and is configured to be displaced between a first lock position and a first release position. A vertical slide member includes a second locking portion that restricts the lateral slide member from being displaced from the first lock position to the first release position, the vertical slide member configured to be displaced between a second lock position and a second release position. A swing member includes a contacted portion and a third locking portion. A cover projection portion includes a third locked portion that is locked to the third locking portion and thereby restricts a document sheet cover from moving upward. When a document sheet reading unit is closed, a main body projection portion pushes up the contacted portion to hold the swing member at a third release position, allowing the contacted portion to extend diagonally upward.

4 Claims, 8 Drawing Sheets

IMAGE FORMING APPARATUS

INCORPORATION BY REFERENCE

This application is based upon and claims the benefit of priority from the corresponding Japanese Patent Application No. 2020-045233 filed on Mar. 16, 2020, the entire contents of which are incorporated herein by reference.

BACKGROUND

The present disclosure relates to an image forming apparatus including a lock mechanism that selectively locks either a document sheet reading unit or a document sheet cover in a closed state.

An image forming apparatus such as a copier, a facsimile apparatus, or a multifunction peripheral includes a main body unit and an image reading device, wherein the main body unit stores a print device. The image reading device includes a document sheet reading unit and a document sheet cover, wherein the document sheet reading unit is configured to read an image from a document sheet placed thereon, and the document sheet cover is configured to cover the document sheet on the document sheet reading unit.

In the image forming apparatus, the document sheet reading unit is coupled with an upper portion of the main body unit in an openable and closable manner. In addition, the document sheet cover is coupled with an upper portion of the document sheet reading unit in an openable and closable manner.

If the document sheet cover is opened when the document sheet reading unit is opened, a large load is applied to a portion that couples the document sheet reading unit with the document sheet cover. As a result, the image forming apparatus may be provided with a lock mechanism that selectively locks either the document sheet reading unit or the document sheet cover in a closed state.

There is known an image forming apparatus in which the lock mechanism includes a link member, a first hook member, a lid member, a second hook member, an arm member, a hook release button, and a lock member, wherein the ink member, the first hook member, the lid member, the second hook member, the arm member, and the hook release button are arranged in the document sheet reading unit, and the lock member is provided in the document sheet cover to project therefrom.

When the document sheet reading unit is closed, the link member swings by being pushed by a projection portion of the main body unit, and in conjunction with the link member, the first hook member swings from a position for locking the lock member to a position for releasing the lock. With this configuration, when the document sheet reading unit is in a closed state, the document sheet cover is opened and closed freely.

When the document sheet cover is closed, the lock member moves to a position where it is engaged with the first hook of the document sheet reading unit, while pressing down the lid member.

The second hook member locks the image reading unit in a closed state by being engaged with a part of the main body unit, and the lid member is integrally formed with a restriction portion that restricts the second hook member from moving in a direction to release the lock.

When the lid member is pressed down, the restriction of the movement of the second hook member by the restriction portion is released. With this configuration, when the hook release button is pressed, the lock of the document sheet reading unit to the second hook member is released.

After the lock of the document sheet reading unit is released, when the document sheet reading unit is opened, the first hook member is engaged with the lock member, and thereby locks the document sheet cover in the closed state. This prevents the document sheet cover from being opened when the document sheet reading unit is opened.

SUMMARY

An image forming apparatus according to an aspect of the present disclosure includes a main body unit, a unit coupling portion, a document sheet reading unit, a document sheet cover, and a lock mechanism. The main body unit includes, on its upper surface, a discharge tray configured to receive a sheet with an image formed thereon. The unit coupling portion includes a back coupling portion and a pair of lateral coupling portions, the back coupling portion standing up at a back portion of the discharge tray on the upper surface of the main body unit, the pair of lateral coupling portions standing up at opposite sides of the discharge tray. The document sheet reading unit is coupled with an upper portion of the unit coupling portion in an openable and closable manner. The document sheet cover is coupled with an upper portion of the document sheet reading unit in an openable and closable manner. The lock mechanism is configured to selectively lock either the document sheet reading unit or the document sheet cover in a closed state. The lock mechanism includes an operation member, a lateral slide member, a vertical slide member, a first elastic member, a swing member, a second elastic member, a main body projection portion, and a cover projection portion. The operation member is provided in one of the pair of lateral coupling portions and configured to be displaced by human operation. The lateral slide member is provided in the document sheet reading unit, is formed to extend in such a way as to reach over the pair of lateral coupling portions, and includes a pair of first locked portions and a second locked portion, the pair of first locked portions being restricted from moving upward by being locked to a pair of first locking portions provided in the pair of lateral coupling portions, respectively, the lateral slide member configured to be displaced along a facing direction in which the pair of lateral coupling portions face each other, between a first lock position and a first release position in conjunction with a displacement of the operation member, wherein when the lateral slide member is located at the first lock position, the pair of first locked portions are locked to the pair of first locking portions, and when the lateral slide member is located at the first release position, a lock of the pair of first locked portions to the pair of first locking portions is released. The vertical slide member is provided in the document sheet reading unit and includes a second locking portion configured to lock the second locked portion and thereby restrict the lateral slide member from being displaced from the first lock position to the first release position, the vertical slide member supported in such a way as to be displaced upward and downward between a second lock position and a second release position, the second release position being located below the second lock position, wherein when the vertical slide member is located at the second lock position, the second locking portion locks the second locked portion, and when the vertical slide member is located at the second release position, a lock of the second locked portion to the second locking portion is released. The first elastic member is configured to elastically bias the vertical slide member upward to hold the vertical slide member at the second lock position. The swing member is provided in the document sheet reading unit and includes a base portion, a contacted portion, and a third locking portion, the base portion being rotationally supported, the contacted portion extending in a lateral direction from the base portion, the third locking portion extending upward from the base portion, the swing member configured to swing between a third lock position and a third release position, wherein when the swing member is located at the third lock position, the contacted portion extends in the lateral direction from the base portion, and when the swing member is located at the third release position, the contacted portion extends diagonally upward from the base portion. The second elastic member is configured to elastically bias the swing member to hold the swing member at the third lock position. The main body projection portion is provided in one of the pair of lateral coupling portions to project therefrom upward and configured to, when the document sheet reading unit is closed, push up the contacted portion against an elastic force of the second elastic member to hold the swing member at the third release position. The cover projection portion is provided in the document sheet cover to project therefrom downward and includes a third locked portion, wherein: when the document sheet cover is in a closed state and the swing member is located at the third lock position, the third locked portion is locked to the third locking portion and thereby restricts the document sheet cover from moving upward; when the swing member swings to the third release position, a lock of the third locked portion to the third locking portion is released; and when the document sheet cover is closed, the cover projection portion pushes down the vertical slide member against a biasing force of the first elastic member and holds the vertical slide member at the second release position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
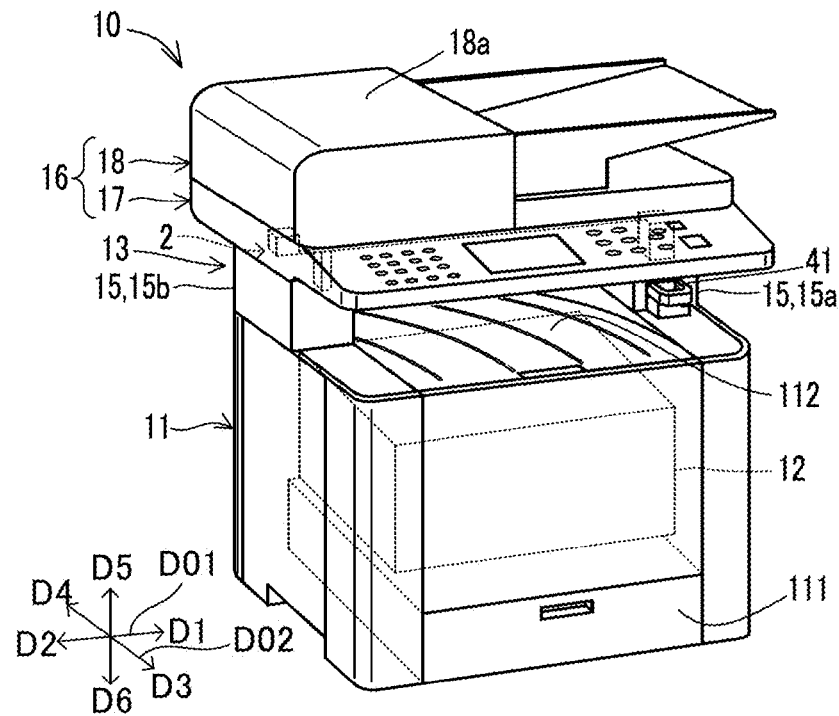
FIG. 1 is a perspective diagram of an image forming apparatus according to an embodiment.

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

An image forming apparatus 10 according to the embodiment is, for example, a copier, a facsimile apparatus, or a multifunction peripheral.

The image forming apparatus 10 includes a main body unit 11, a unit coupling portion 13, and an image reading device 16, wherein the main body unit 11 stores a print device 12. The print device 12 conveys sheets stored in a sheet storage portion 111 one by one and forms images on the sheets.

The print device 12 further discharges the sheets on which images have been formed, onto a discharge tray 112. The main body unit 11 is provided with, on an upper surface thereof, the discharge tray 112 for receiving the sheets with images formed thereon.

The unit coupling portion 13 is coupled with an upper portion of the main body unit 11. The unit coupling portion 13 includes a back coupling portion 14 and a pair of lateral coupling portions 15, wherein the back coupling portion 14 stands up at a back portion of the discharge tray 112 on the upper surface of the main body unit 11, and the pair of lateral coupling portions 15 stand up at opposite sides of the discharge tray 112.

The pair of lateral coupling portions 15 face each other in a width direction D01 of the main body unit 11. That is, the width direction D01 is a facing direction in which the pair of lateral coupling portions 15 face each other. For example, each of the back coupling portion 14 and the back coupling portions 15 includes a metal frame and a synthetic resin member that is fixed to the metal frame.

In the drawings, a rightward direction D1, a leftward direction D2, a frontward direction D3, a backward direction D4, an upward direction D5, and a downward direction D6 are shown with arrows. It is noted that the rightward direction D1 and the leftward direction D2 extend along the width direction D01.

In the following description, one of the lateral coupling portions 15 is referred to as a first lateral coupling portion 15a, and the other is referred to as a second lateral coupling portion 15b. In the example shown in FIG. 1, when the image forming apparatus 10 is viewed from the front side, a lateral coupling portion 15 on the right side is the first lateral coupling portion 15a, and a lateral coupling portion 15 on the left side is the second lateral coupling portion 15b.

The image reading device 16 includes a document sheet reading unit 17 and a document sheet cover 18, wherein the document sheet reading unit 17 is configured to read an image from a document sheet placed thereon, and the document sheet cover 18 is configured to cover the document sheet on the document sheet reading unit 17. In the present embodiment, the document sheet cover 18 includes a document sheet automatic feeder 18a that automatically feeds document sheets one by one.

Figure 2:
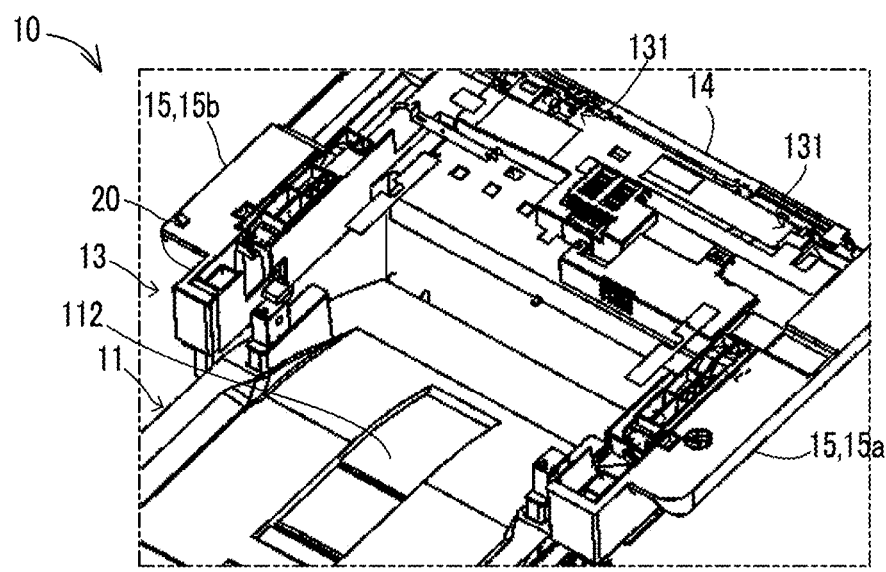
FIG. 2 is a perspective diagram of a main body unit and a unit coupling portion of the image forming apparatus according to the embodiment.

The document sheet reading unit 17 is coupled with an upper portion of the unit coupling portion 13 by a hinge in an openable and closable manner (see FIG. 2). In addition, the document sheet cover 18 is coupled with an upper portion of the document sheet reading unit 17 by a hinge (not shown) in an openable and closable manner.

If the document sheet cover 18 is opened when the document sheet reading unit 17 is opened, a large load is applied to the hinge (not shown) that couples the document sheet reading unit 17 with the document sheet cover 18. As a result, the image forming apparatus 10 is provided with a lock mechanism 2 that selectively locks either the document sheet reading unit 17 or the document sheet cover 18 in a closed state.

Meanwhile, with miniaturization of the document sheet reading unit 17 due to adoption of CIS or the like, the lock mechanism 2 needs to be small and simple. In particular, the document sheet reading unit 17 becomes thinner with the adoption of the CIS. As a result, parts of the lock mechanism 2 that are arranged in the document sheet reading unit 17 are desired to be small in height.

As described below, the lock mechanism 2 of the present embodiment has a small and simple mechanism.

[Lock Mechanism 2]

Figure 3:
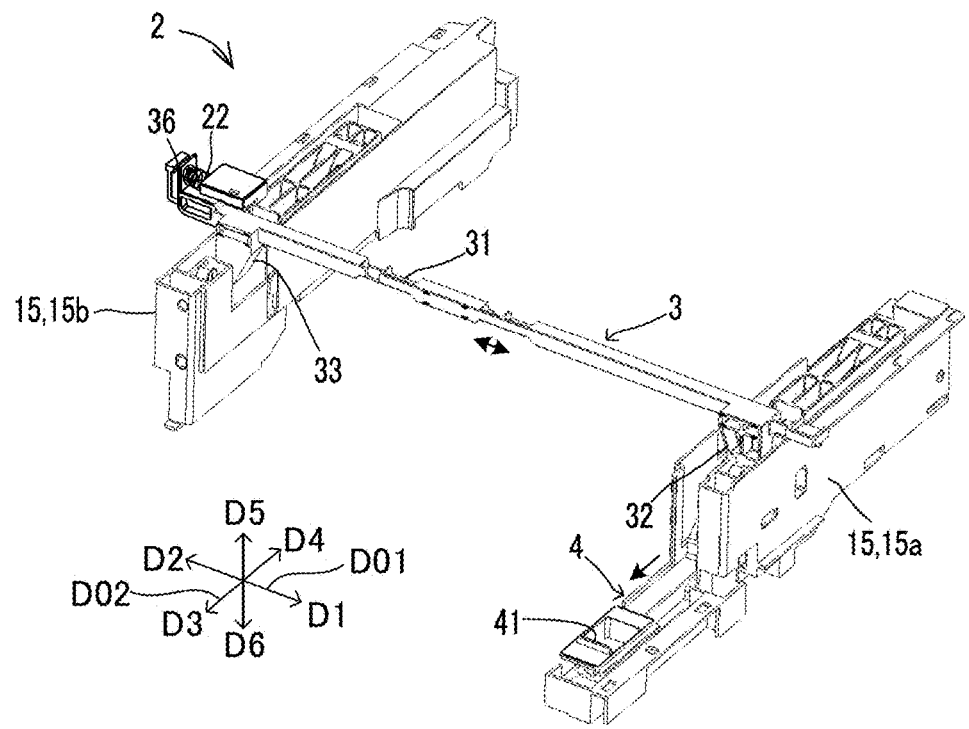
FIG. 3 is a perspective diagram of a pair of lateral coupling portions and a lateral slide member of the image forming apparatus according to the embodiment.
Figure 4:
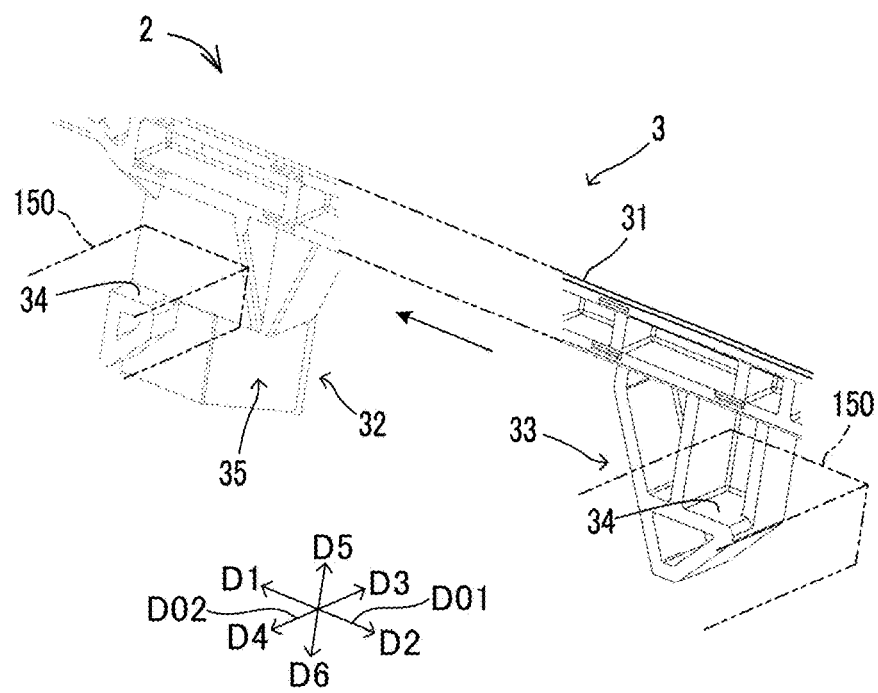
FIG. 4 is a perspective diagram of a pair of protruding portions of the lateral slide member in a lock mechanism of the image forming apparatus according to the embodiment.
Figure 5:
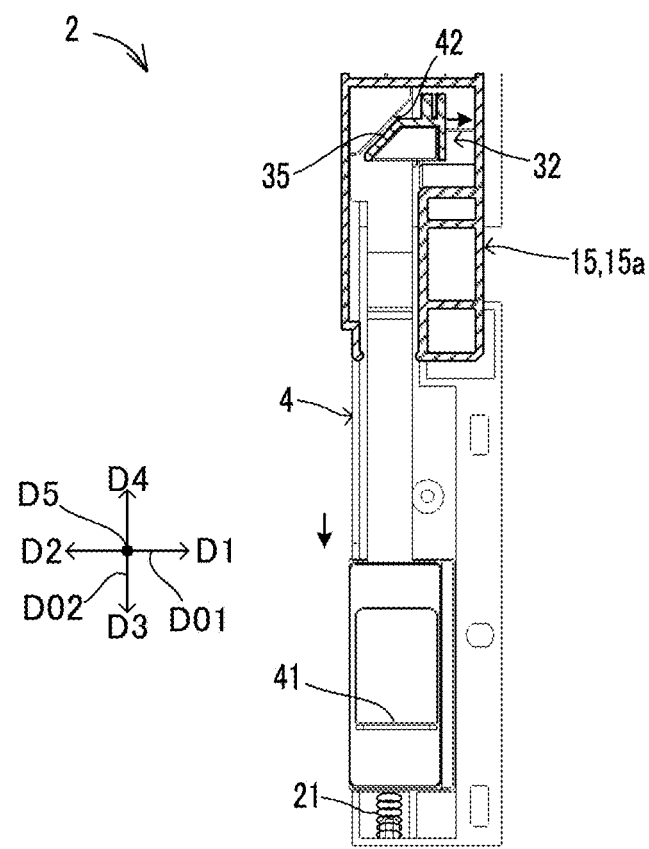
FIG. 5 is a partial plane cross-sectional diagram of a part of the lateral slide member in the lock mechanism and an operation member of the image forming apparatus according to the embodiment.
Figure 6:
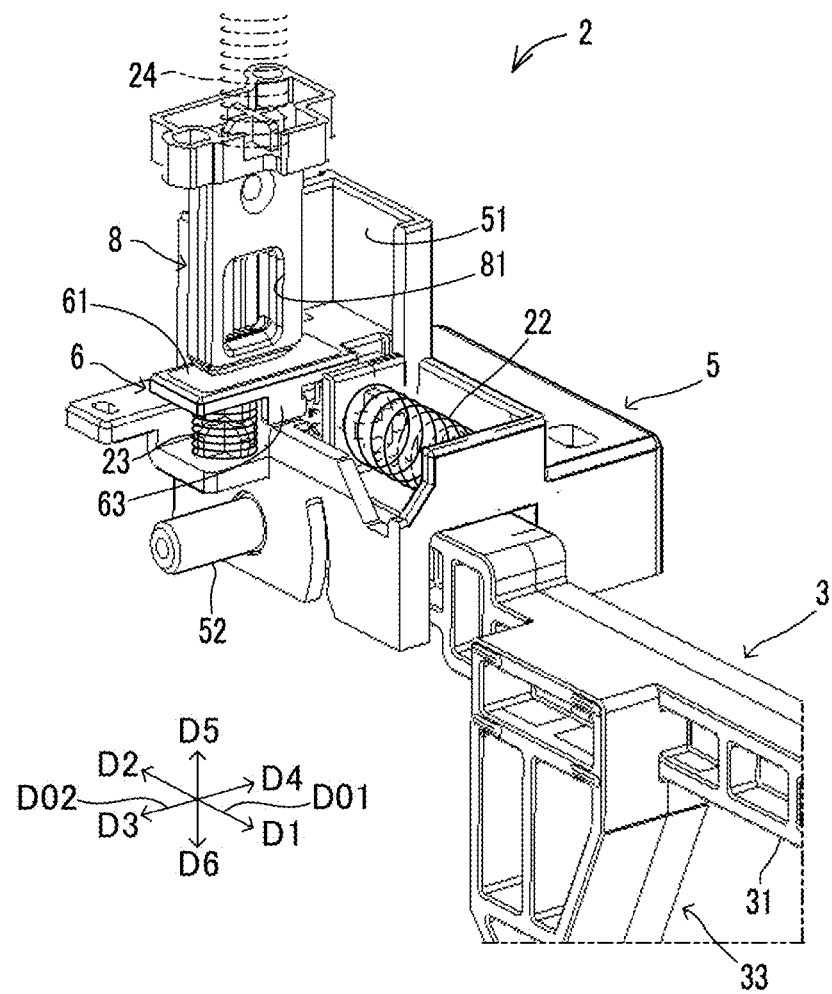
FIG. 6 is a perspective diagram of a peripheral of an end portion of the lateral slide member in the lock mechanism of the image forming apparatus according to the embodiment.
Figure 7:
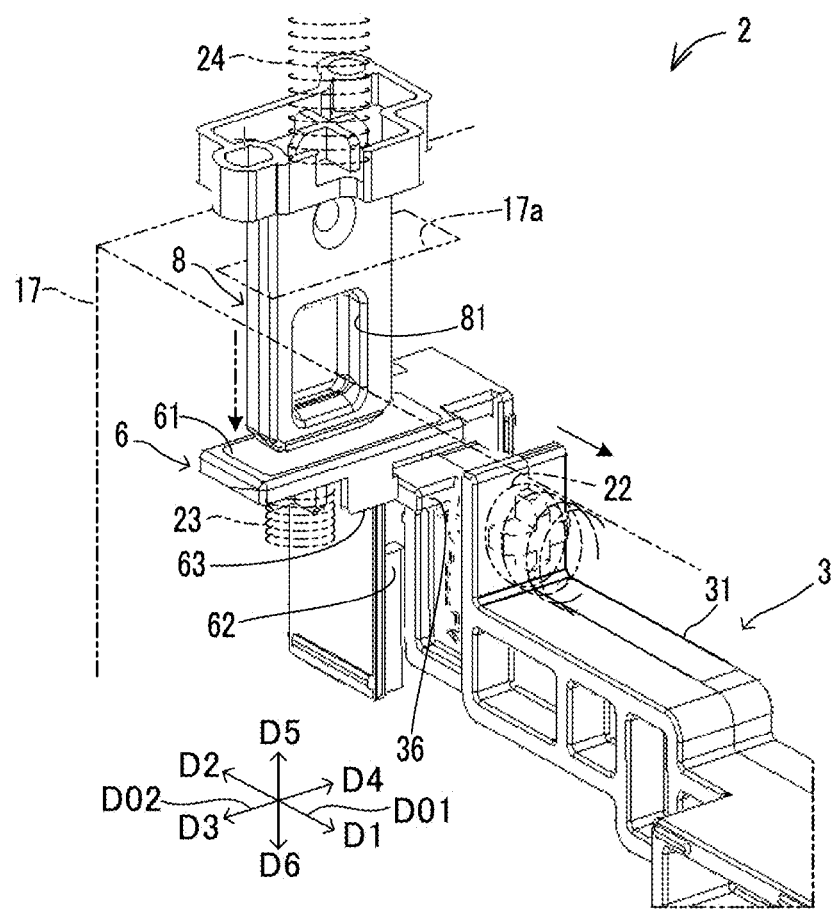
FIG. 7 is a partially omitted perspective diagram of the peripheral of the end portion of the lateral slide member in the lock mechanism of the image forming apparatus according to the embodiment.
Figure 8:
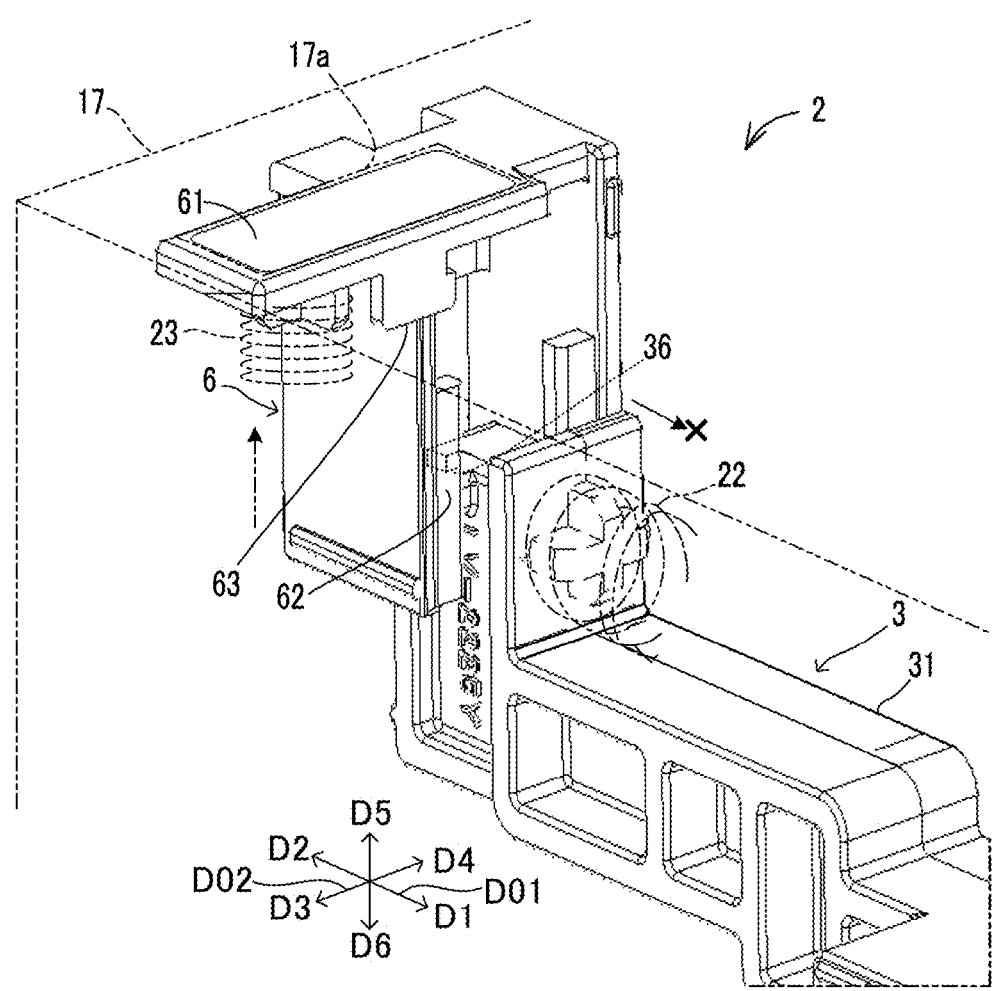
FIG. 8 is a perspective diagram of the peripheral of the end portion of the lateral slide member and a vertical slide member in the lock mechanism of the image forming apparatus according to the embodiment.
Figure 9:
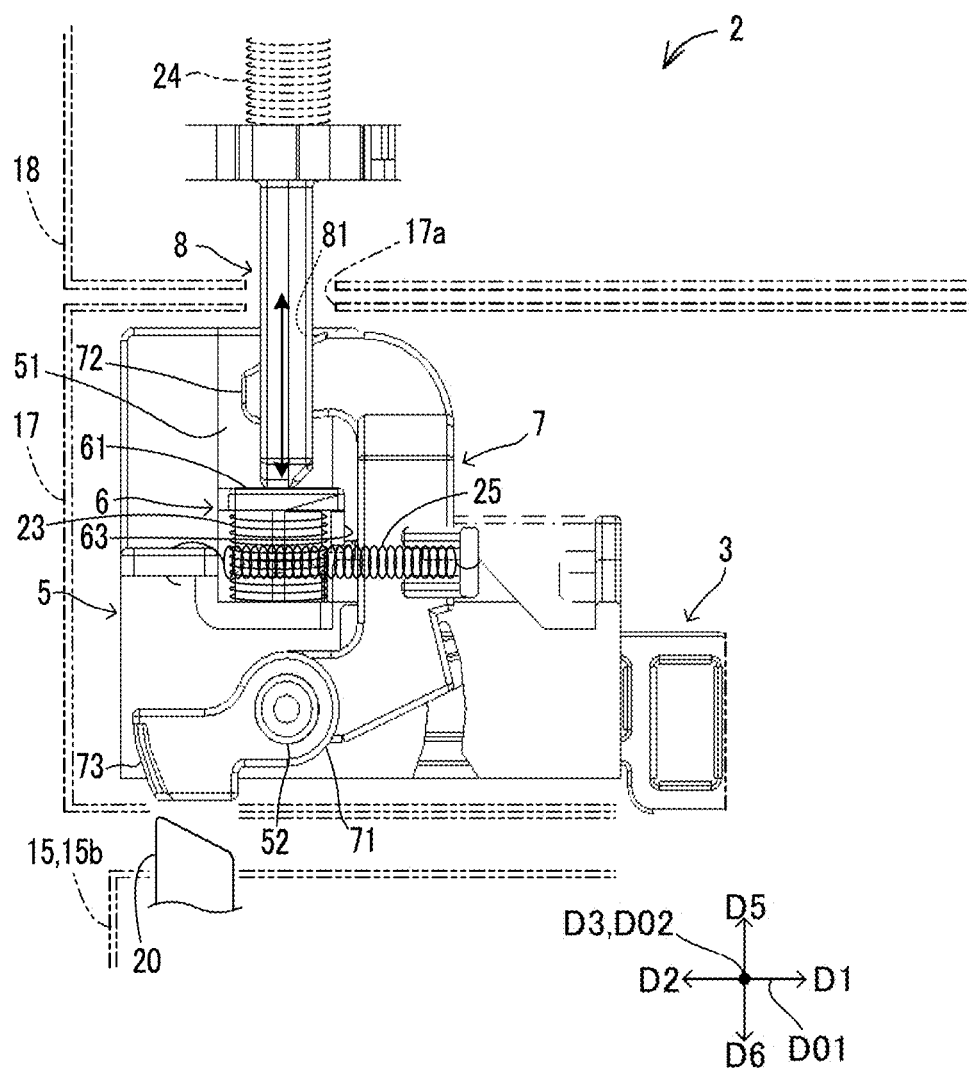
FIG. 9 is a first front diagram of the peripheral of the end portion of the lateral slide member in the lock mechanism of the image forming apparatus according to the embodiment (cover lock state).
Figure 10:
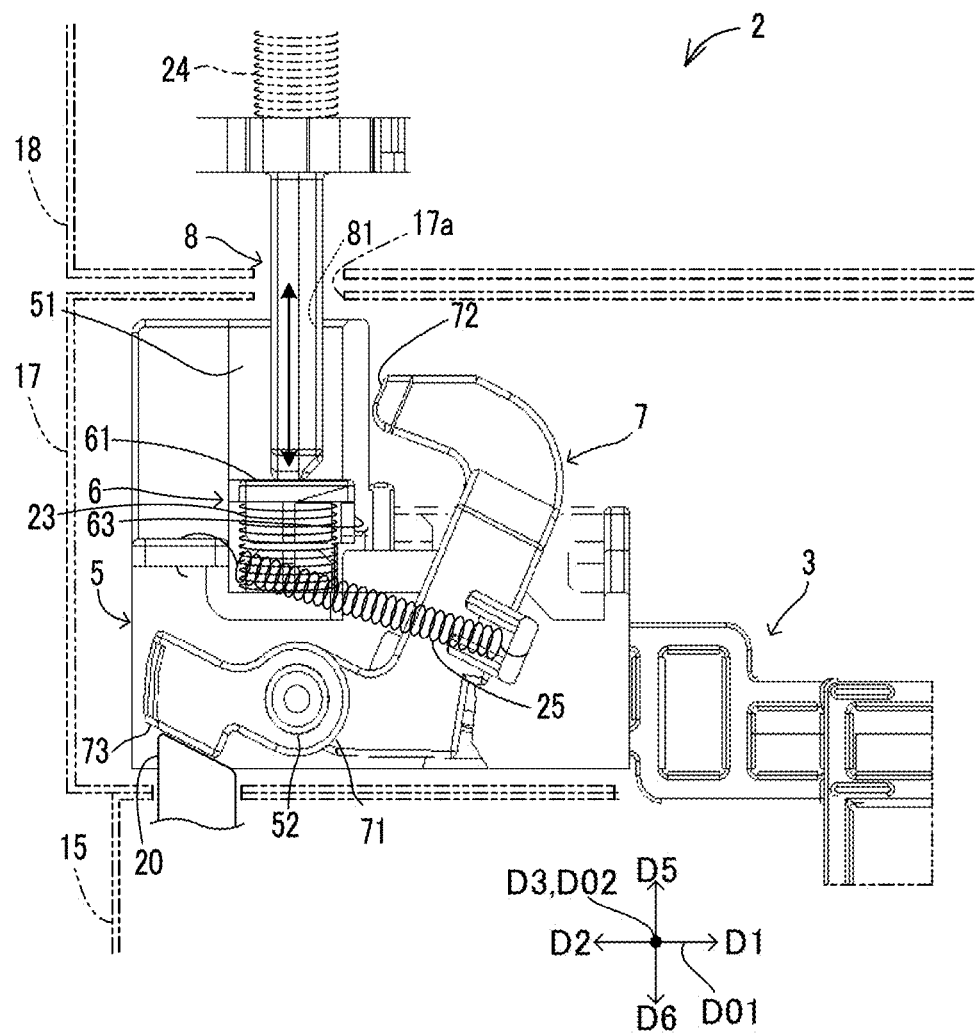
FIG. 10 is a second front diagram of the peripheral of the end portion of the lateral slide member in the lock mechanism of the image forming apparatus according to the embodiment (cover lock release state).

The lock mechanism 2 includes an operation member 4 shown in FIG. 3 and FIG. 5, a lateral slide member 3 shown in FIG. 3, FIG. 4 and the like, a support member 5 shown in FIG. 6, FIG. 9 and FIG. 10, a vertical slide member 6 shown in FIG. 6 to FIG. 10, a swing member 7 shown in FIG. 9 and FIG. 10, a main body projection portion 20 shown in FIG. 9 and FIG. 10, and a cover projection portion 8 shown in FIG. 6, FIG. 7, FIG. 9 and FIG. 10. The lock mechanism 2 further includes a plurality of springs 21, 22, 23, 24 and 25.

The operation member 4 is provided in one of the pair of lateral coupling portions 15. In the present embodiment, the operation member 4 is provided in the first lateral coupling portion 15a. The operation member 4 is supported in such a way as to be displaced by human operation.

In the present embodiment, the operation member 4 is supported in such a way as to be displaced between an initial position and a pullout position along a front-back direction D02 of the main body unit 11, wherein the pullout position is located in front of the initial position. A handle 41 that can be directly operated by a hand is formed at an end of the operation member 4 in the frontward direction D3.

FIG. 5 shows a state where the operation member 4 is located at the initial position. The operation member 4 is elastically biased in the backward direction D4 by a spring 21 provided in the first lateral coupling portion 15a. The spring 21 elastically biases the operation member 4 to hold the operation member 4 at the initial position. It is noted that the spring 21 is an example of a fifth elastic member.

As shown in FIG. 3, the lateral slide member 3 is provided in the document sheet reading unit 17 and is formed to extend in such a way as to reach over the pair of lateral coupling portions 15. The lateral slide member 3 includes a lateral bar portion 31, a pair of downward protruding portions 32 and 33, and a lateral locked portion 36.

The lateral bar portion 31 is formed to extend along the width direction D01 in such a way as to reach over the pair of lateral coupling portions 15. The pair of downward protruding portions 32 and 33 are formed to protrude downward from portions of the lateral bar portion 31 that are located above the pair of lateral coupling portions 15.

The pair of downward protruding portions 32 and 33 include a first downward protruding portion 32 and a second downward protruding portion 33, wherein the first downward protruding portion 32 protrudes from the lateral bar portion 31 toward the first lateral coupling portion 15a, and the second downward protruding portion 33 protrudes from the lateral bar portion 31 toward the second lateral coupling portion 15b.

Each of the first downward protruding portion 32 and the second downward protruding portion 33 includes a unit locked portion 34 (see FIG. 3). That is, the lateral slide member 3 includes a pair of unit locked portions 34. The pair of unit locked portions 34 are restricted from moving upward by being locked to a pair of main body locking portions 150 provided in the pair of lateral coupling portions 15, respectively.

That is, when the pair of unit locked portions 34 are locked to the pair of main body locking portions 150, the lateral slide member 3 is restricted from moving upward. This causes the document sheet reading unit 17 to be locked in the closed state. It is noted that the pair of unit locked portions 34 are an example of a pair of first locked portions, and the main body locking portions 150 are an example of a pair of first locking portions.

The lateral slide member 3 is supported in such a way as to be displaced along the width direction D01 between a lateral reference position and a lateral release position in conjunction with a displacement of the operation member 4. When the lateral slide member 3 is located at the lateral reference position, the pair of unit locked portions 34 are locked to the pair of main body locking portions 150. The lateral reference position is an example of a first lock position.

For example, as shown in FIG. 5, a first taper portion 35 is formed in the operation member 4, and a second taper portion 42 is formed in the first downward protruding portion 32 of the lateral slide member 3. The second taper portion 42 is in contact with the first taper portion 35.

When the operation member 4 is displaced from the initial position in the frontward direction D3, the first taper portion 35 slides along the second taper portion 42 while applying a pressing force along the width direction D01 to the second taper portion 42. The pressing force is applied in a direction from the lateral reference position toward the lateral release position. In the present embodiment, the direction from the lateral reference position toward the lateral release position is the rightward direction D1.

When the second taper portion 42 receives the pressing force from the first taper portion 35, the lateral slide member 3 is displaced from the lateral reference position to the lateral release position.

That is, when the operation member 4 is pulled frontward against the biasing force of the spring 21, the operation member 4 is displaced from the initial position to the pullout position. At this time, the lateral slide member 3 is displaced from the lateral reference position to the lateral release position in conjunction with the operation member 4 due to the action of the first taper portion 35 and the second taper portion 42.

In the present embodiment, an operation of pulling the operation member 4 in the frontward direction D3 is a lock release operation to release the lock of the document sheet reading unit 17 in the closed state. In general, the operation of pulling the operation member 4 in the frontward direction D3 applies a stronger force to the operation member 4 than an operation of pushing the operation member 4 in the backward direction D4.

The spring 22 is provided in the document sheet reading unit 17 (see FIG. 6 to FIG. 8). The spring 22 elastically biases the lateral slide member 3 to hold the lateral slide member 3 at the lateral reference position. That is, the spring 22 elastically biases the lateral slide member 3 in a direction from the lateral release position toward the lateral reference position. The spring 22 is an example of a fourth elastic member.

On the other hand, when the operation member 4 is displaced from the pullout position to the initial position, the lateral slide member 3 returns from the lateral release position to the lateral reference position by the elastic biasing force received from the spring 22. It is noted that the spring 22 is shown in FIG. 6.

FIG. 4 shows a state where the pair of unit locked portions 34 are locked to the pair of main body locking portions 150 due to presence of the lateral slide member 3 at the lateral reference position. It is noted that, for convenience's sake, in FIG. 4, the pair of main body locking portions 150 are indicated by an imaginary line (a two-dot chain line).

When the lateral slide member 3 is located at the lateral release position, the lock of the pair of unit locked portions 34 to the pair of main body locking portions 150 is released. The lateral release position is an example of a first release position.

It is noted that the lateral locked portion 36 is locked by a part of the vertical slide member 6 that is described below. The function of the lateral locked portion 36 is described below. The lateral locked portion 36 is an example of a second locked portion.

The support member 5 and the vertical slide member 6 are provided in the document sheet reading unit 17. In the present embodiment, the support member 5 and the vertical slide member 6 are provided above the second lateral coupling portion 15b.

The support member 5 includes a slide support portion 51 that supports the vertical slide member 6 such that the vertical slide member 6 can be displaced upward and downward. That is, the vertical slide member 6 is supported by the slide support portion 51 such that the vertical slide member 6 can be displaced upward and downward.

The vertical slide member 6 includes a lid portion 61 and a lateral locking portion 62 (see FIG. 7). The vertical slide member 6 further includes a partition wall portion 63.

The lateral locking portion 62 locks the lateral locked portion 36 of the lateral slide member 3 and thereby restricts the lateral slide member 3 from being displaced from the lateral reference position to the lateral release position. The lateral locking portion 62 is an example of a second locking portion.

The vertical slide member 6 is supported in such a way as to be displaced upward and downward between a vertical reference position and a vertical release position, wherein the vertical release position is located below the vertical reference position. When the vertical slide member 6 is located at the vertical reference position, the lateral locking portion 62 locks the lateral locked portion 36.

On the other hand, when the vertical slide member 6 is displaced from the vertical reference position to the vertical release position, the lock of the lateral locked portion 36 to the lateral locking portion 62 is released. In addition, when the vertical slide member 6 is located at the vertical release position, the lid portion 61 closes an opening 17a that is formed in an upper surface of the document sheet reading unit 17 (see FIG. 8).

It is noted that the vertical reference position is an example of a second lock position, and the vertical release position is an example of a second release position.

FIG. 8 shows a state where the vertical slide member 6 is located at the vertical reference position, and the lateral locking portion 62 locks the lateral locked portion 36. On the other hand, FIG. 7 shows a state where the vertical slide member 6 is located at the vertical release position, and the lock of the lateral locked portion 36 to the lateral locking portion 62 is released.

Accordingly, the lateral slide member 3 is displaced from the lateral reference position to the lateral release position in conjunction with the displacement of the operation member 4 only when the vertical slide member 6 has been displaced from the vertical reference position to the vertical release position.

In other words, when the vertical slide member 6 is located at the vertical reference position, the operation member 4 is locked and the operation member 4 cannot be pulled out from the initial position to the pullout position.

As shown in FIG. 6, the vertical slide member 6 is elastically biased by the spring 23 upward. The spring 23 elastically biases the vertical slide member 6 upward to hold the vertical slide member 6 at the vertical reference position. It is noted that the spring 23 is an example of a first elastic member.

As shown in FIG. 9, the swing member 7 is provided in the document sheet reading unit 17. The swing member 7 includes a base portion 71 that is rotationally supported by a support shaft 52 formed in the support member 5. The swing member 7 further includes a hook 72 and a contacted portion 73, wherein the hook 72 extends upward from the base portion 71, and the contacted portion 73 extends in a lateral direction from the base portion 71. The lateral direction is along a horizontal direction.

As shown in FIG. 9 and FIG. 10, the swing member 7 is configured to swing around the base portion 71 between a swing reference position and a swing release position, wherein when the swing member 7 is located at the swing reference position, the contacted portion 73 extends in the lateral direction from the base portion 71, and when the swing member 7 is located at the swing release position, the contacted portion 73 extends diagonally upward from the base portion 71.

It is noted that when the swing member 7 is located at the swing reference position, the hook 72 extends directly upward from the base portion 71, and when the swing member 7 is located at the swing release position, the hook 72 extends diagonally upward from the base portion 71 (see FIG. 9, FIG. 10).

FIG. 9 shows a state where the swing member 7 is located at the swing reference position, and FIG. 10 shows a state where the swing member 7 is located at the swing release position. It is noted that the swing reference position is an example of a third lock position, and the swing release position is an example of a third release position.

The swing member 7 is elastically biased by the spring 25. The spring 25 elastically biases the swing member 7 to hold the swing member 7 at the swing reference position (see FIG. 9). It is noted that the spring 25 is an example of a second elastic member.

As shown in FIG. 9 and FIG. 10, the main body projection portion 20 is provided in one of the pair of lateral coupling portions 15 to project therefrom upward. In the present embodiment, the main body projection portion 20 is provided in the second coupling portion 15b.

When the document sheet reading unit 17 is closed, the main body projection portion 20 pushes up the contacted portion 73 against the elastic force of the spring 25 to hold the swing member 7 at the swing release position (see FIG. 10).

On the other hand, when the document sheet reading unit 17 is opened, the contacted portion 73 is separated from the main body projection portion 20. This causes the swing member 7 to be held at the swing reference position by the elastic force of the spring 25 (see FIG. 9).

As shown in FIG. 9 and FIG. 10, the cover projection portion 8 is provided in the document sheet cover 18 to project therefrom downward. As shown in FIG. 6 and FIG. 7, the cover projection portion 8 includes a hook hole portion 81 in which a through hole is formed.

When the document sheet cover 18 is in a closed state and the swing member 7 is located at the swing reference position, the hook hole portion 81 is locked to the hook 72 and thereby restricts the document sheet cover 18 from moving upward (see FIG. 9). The state where the hook 72 is inserted in the through hole of the hook hole portion 81 is the state where the hook 72 locks the hook hole portion 81.

It is noted that the hook 72 is an example of a third locking portion, and the hook hole portion 81 is an example of a third locked portion.

That is, the hook 72 of the swing member 7 located at the swing reference position locks the cover projection portion 8 that projects from the document sheet cover 18 in the closed state and thereby locks the document sheet cover 18 in the closed state.

The partition wall portion 63 of the vertical slide member 6 partitions between the spring 23 and the hook 72 (see FIG. 9, FIG. 10). This prevents the hook 72 and the spring 23 from contacting each other and thereby prevents a contact of the hook 72 and the spring 23 from hindering an upward or downward displacement of the vertical slide member 6.

When the document sheet cover 18 is closed, the cover projection portion 8 is inserted in the document sheet reading unit 17 from the opening 17a of the upper surface of the document sheet reading unit 17 (see FIG. 7, FIG. 9, FIG. 10).

When the document sheet cover 18 is closed, the cover projection portion 8 pushes down the vertical slide member 6 against the biasing force of the spring 23 and holds the vertical slide member 6 at the vertical release position (see FIG. 9, FIG. 10). In the present embodiment, the cover projection portion 8 abuts on the lid portion 61 of the vertical slide member 6 and thereby pushes down the vertical slide member 6.

In addition, when the swing member 7 swings from the swing reference position to the swing release position, the lock of the cover projection portion 8 to the hook 72 is released (see FIG. 10). As described above, as far as the document sheet reading unit 17 is in the closed state, the swing member 7 is held at the swing release position by the main body projection portion 20.

A state where the document sheet reading unit 17 is in the closed state and no operation is being performed on the operation member 4 is the normal state of the image forming apparatus 10.

In the normal state, the lateral slide member 3 is held at the lateral reference position by the action of the spring 22, and the document sheet reading unit 17 is locked in the closed state by the action of the pair of main body locking portions 150 (see FIG. 4, FIG. 5).

The pair of main body locking portions 150 lock the pair of unit locked portions 34 at positions that are widely apart in the width direction D01. This allows the document sheet reading unit 17 that is relatively heavy, to be stably locked.

In addition, in the normal state, the swing member 7 is held at the swing release position by the action of the main body projection portion 20 (see FIG. 10). This allows the document sheet cover 18 to be opened and closed freely.

On the other hand, when the lock release operation is performed on the operation member 4, the lock of the document sheet reading unit 17 to the pair of main body locking portions 150 is released, and the document sheet reading unit 17 can be opened.

If the document sheet reading unit 17 is opened in a state where the lock release operation has been performed on the operation member 4, the main body projection portion 20 is separated from the contacted portion 73 of the swing member 7. This causes the hook 72 to lock the cover projection portion 8 and thereby lock the document sheet cover 18 in the closed state. This prevents the document sheet cover 18 from being opened when the document sheet reading unit 17 is opened.

In addition, the contacted portion 73 of the swing member 7 extends in the lateral direction from the base portion 71. Furthermore, no part is disposed below the swing member 7 in the document sheet reading unit 17. This reduces the vertical size of the swing member 7. That is, it is possible to reduce the vertical size of a part stored in the document sheet reading unit 17.

Furthermore, locking and releasing the lock of the document sheet reading unit 17 are realized by the displacement of the lateral slide member 3 in the width direction D01. This reduces the size of the lock mechanism 2 in the front-back direction D02.

In the present embodiment, the cover projection portion 8 is provided in the document sheet cover 18 in such a way as to project and recede from the lower surface of the document sheet cover 18. The spring 24 is provided in the document sheet cover 18. The spring 24 elastically biases the cover projection portion 8 downward and thereby holds the cover projection portion 8 in the state of projecting from the lower surface of the document sheet cover 18.

The biasing force of the spring 23 applied to the vertical slide member 6 is weaker than the biasing force of the spring 24 applied to the cover projection portion 8. As a result, when the document sheet cover 18 is closed, the cover projection portion 8 is kept to be held in the state of projecting from the lower surface of the document sheet cover 18 and pushes down the vertical slide member 6 against the biasing force of the spring 23. It is noted that the spring 24 is an example of a third elastic member.

The spring 23 and the spring 24 are arranged at positions that overlap with the cover projection portion 8 and the vertical slide member 6 when viewed from above. This prevents the biasing forces of the spring 23 and the spring 24 from acting as forces that swing the vertical slide member 6 when the document sheet cover 18 is closed.

If the vertical slide member 6 swings when it is displaced from the vertical reference position to the vertical release position, the vertical slide member 6 cannot be displaced smoothly. The above-described arrangement of the spring 23 and the spring 24 allows the vertical slide member 6 to be displaced smoothly.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a main body unit including, on its upper surface, a discharge tray configured to receive a sheet with an image formed thereon;
a unit coupling portion including a back coupling portion and a pair of lateral coupling portions, the back coupling portion standing up at a back portion of the discharge tray on the upper surface of the main body unit, the pair of lateral coupling portions standing up at opposite sides of the discharge tray;
a document sheet reading unit coupled with an upper portion of the unit coupling portion in an openable and closable manner;
a document sheet cover coupled with an upper portion of the document sheet reading unit in an openable and closable manner; and
a lock mechanism configured to selectively lock either the document sheet reading unit or the document sheet cover in a closed state, wherein
the lock mechanism includes:
an operation member provided in one of the pair of lateral coupling portions and configured to be displaced by human operation;
a lateral slide member that is provided in the document sheet reading unit, is formed to extend in such a way as to reach over the pair of lateral coupling portions, and includes a pair of first locked portions and a second locked portion, the pair of first locked portions being restricted from moving upward by being locked to a pair of first locking portions provided in the pair of lateral coupling portions, respectively, the lateral slide member configured to be displaced along a facing direction in which the pair of lateral coupling portions face each other, between a first lock position and a first release position in conjunction with a displacement of the operation member, wherein when the lateral slide member is located at the first lock position, the pair of first locked portions are locked to the pair of first locking portions, and when the lateral slide member is located at the first release position, a lock of the pair of first locked portions to the pair of first locking portions is released;
a vertical slide member provided in the document sheet reading unit and including a second locking portion configured to lock the second locked portion and thereby restrict the lateral slide member from being displaced from the first lock position to the first release position, the vertical slide member supported in such a way as to be displaced upward and downward between a second lock position and a second release position, the second release position being located below the second lock position, wherein when the vertical slide member is located at the second lock position, the second locking portion locks the second locked portion, and when the vertical slide member is located at the second release position, a lock of the second locked portion to the second locking portion is released;
a first elastic member configured to elastically bias the vertical slide member upward to hold the vertical slide member at the second lock position;
a swing member provided in the document sheet reading unit and including a base portion, a contacted portion, and a third locking portion, the base portion being rotationally supported, the contacted portion extending in a lateral direction from the base portion, the third locking portion extending upward from the base portion, the swing member configured to swing between a third lock position and a third release position, wherein when the swing member is located at the third lock position, the contacted portion extends in the lateral direction from the base portion, and when the swing member is located at the third release position, the contacted portion extends diagonally upward from the base portion;
a second elastic member configured to elastically bias the swing member to hold the swing member at the third lock position;
a main body projection portion provided in one of the pair of lateral coupling portions to project therefrom upward and configured to, when the document sheet reading unit is closed, push up the contacted portion against an elastic force of the second elastic member to hold the swing member at the third release position; and
a cover projection portion provided in the document sheet cover to project therefrom downward and including a third locked portion, wherein: when the document sheet cover is in a closed state and the swing member is located at the third lock position, the third locked portion is locked to the third locking portion and thereby restricts the document sheet cover from moving upward; when the swing member swings to the third release position, a lock of the third locked portion to the third locking portion is released; and when the document sheet cover is closed, the cover projection portion pushes down the vertical slide member against a biasing force of the first elastic member and holds the vertical slide member at the second release position.

2. The image forming apparatus according to claim 1, further comprising:
a third elastic member provided in the document sheet cover, wherein
the cover projection portion is provided in such a way as to project and recede from a lower surface of the document sheet cover,
the first elastic member and the third elastic member are arranged at positions that overlap with the cover projection portion and the vertical slide member when viewed from above,
the third elastic member elastically biases the cover projection portion downward and thereby holds the cover projection portion in a state of projecting from the lower surface of the document sheet cover, and
a biasing force of the first elastic member applied to the vertical slide member is weaker than a biasing force of the third elastic member applied to the cover projection portion.

3. The image forming apparatus according to claim 2, wherein
the vertical slide member further includes a partition wall portion that partitions between the first elastic member and the third locking portion.

4. The image forming apparatus according to claim 1, further comprising:

a fourth elastic member provided in the document sheet reading unit and configured to elastically bias the lateral slide member to hold the lateral slide member at the first lock position; and a fifth elastic member provided in one of the pair of lateral coupling portions and configured to elastically bias the operation member, wherein the operation member is supported in such a way as to be displaced between an initial position and a pullout position along a front-back direction of the main body unit, the pullout position being located in front of the initial position, the fifth elastic member is configured to elastically bias the operation member to hold the operation member at the initial position, and when the operation member is pulled frontward against a biasing force of the fifth elastic member, the operation member is displaced from the initial position to the pullout position, and the lateral slide member is displaced from the first lock position to the first release position in conjunction with the operation member.

* * * * *